US007490401B2

(12) United States Patent
Mossbeck et al.

(10) Patent No.: US 7,490,401 B2
(45) Date of Patent: Feb. 17, 2009

(54) POSITIONING DEVICE FOR STAPLE GUNS AND METHOD OF USE

(75) Inventors: Niels S. Mossbeck, Carthage, MO (US); Franklin H. Rawlings, Diamond, MO (US)

(73) Assignee: L&P Property Management Company, South Gate, CA (US)

( * ) Notice: Subject to any disclaimer, the term of this patent is extended or adjusted under 35 U.S.C. 154(b) by 638 days.

(21) Appl. No.: 11/154,362

(22) Filed: Jun. 16, 2005

(65) Prior Publication Data

US 2006/0011696 A1 Jan. 19, 2006

Related U.S. Application Data

(63) Continuation-in-part of application No. 11/059,940, filed on Feb. 17, 2005.

(60) Provisional application No. 60/561,543, filed on Apr. 9, 2004.

(51) Int. Cl.
*B23P 19/00* (2006.01)
*B27F 7/00* (2006.01)
*B23P 11/00* (2006.01)

(52) U.S. Cl. ........................... 29/798; 29/91.1; 29/432; 29/33 K; 227/110; 227/100

(58) Field of Classification Search .................. 29/432, 29/91.1, 33 K, 798, 700, 281.6; 227/153, 227/152, 159, 50, 30, 29, 28, 37, 40, 110, 227/100, 2, 5
See application file for complete search history.

(56) References Cited

U.S. PATENT DOCUMENTS 2,169,433 A 8/1939 Roy ............................ 227/10
2,946,060 A 7/1960 Powers ....................... 227/120
3,084,345 A 4/1963 Hodges, Jr. .................. 227/20
3,168,745 A 2/1965 Winters
3,190,522 A 6/1965 Winters ....................... 227/40
3,737,927 A 6/1973 Kline et al. .................... 5/260
3,753,404 A 8/1973 Bryan, Jr. .................. 104/17.1
3,770,180 A 11/1973 Slumpf
3,789,495 A 2/1974 Slumpf ........................ 29/429
4,152,558 A 5/1979 Newman ................ 200/61.42
4,518,907 A 5/1985 Giguere
4,652,806 A 3/1987 Aiello
4,876,787 A 10/1989 Ditty et al. .................... 29/430
4,929,879 A 5/1990 Wright et al.
4,995,087 A 2/1991 Rathi et al.
5,052,064 A 10/1991 Hagemeister .................. 5/246
5,054,678 A 10/1991 Nasiatka ........................ 227/8
5,083,073 A 1/1992 Kato
5,194,791 A 3/1993 Cull (Continued)

*Primary Examiner*—Essama Omgba
(74) *Attorney, Agent, or Firm*—Wood, Herron & Evans, LLP

(57) ABSTRACT

Apparatus for manufacturing a bedding foundation having a base and a wire grid of support wires, comprising at least one vertically moveable staple gun having a staple head and a wire positioner associated with the staple head, the wire positioner being configured to engage one of the support wires and to position the one support wire relative to the staple head such that upon activation, the staple gun staples the one support wire in the intended position to the base, wherein the wire positioner has a fixed positioning element and a movable positioning element, the elements adapted to position the one support wire therebetween.

5 Claims, 20 Drawing Sheets

U.S. PATENT DOCUMENTS

| | | | | |
|---|---|---|---|---|
| 5,321,353 | A | 6/1994 | Furness | |
| 5,361,434 | A | 11/1994 | Hagemeister | 5/247 |
| 5,422,835 | A | 6/1995 | Houle et al. | 708/103 |
| 5,483,440 | A | 1/1996 | Aono et al. | |
| 5,497,541 | A | 3/1996 | Nogueira | 29/33 K |
| 5,533,146 | A | 7/1996 | Iwai | |
| 5,583,620 | A | 12/1996 | Miyamoto | |
| 5,611,130 | A | 3/1997 | Rummell et al. | 29/34 B |
| 5,772,096 | A | 6/1998 | Osuka et al. | 227/5 |
| 5,904,789 | A | 5/1999 | Durkos | 156/64 |
| 6,220,494 | B1 | 4/2001 | Raffoni | 227/2 |
| 6,935,546 | B2 | 8/2005 | Durkos | 227/110 |
| 7,222,402 | B1 * | 5/2007 | Durkos | 29/91.1 |
| 2005/0210647 | A1 * | 9/2005 | Durkos | 29/91.1 |
| 2005/0251981 | A1 * | 11/2005 | Mossbeck et al. | 29/91.1 |

* cited by examiner

POSITIONING DEVICE FOR STAPLE GUNS AND METHOD OF USE

RELATED APPLICATIONS

This application is a continuation-in-part of utility application Ser. No. 11/059,940 filed Feb. 17, 2005, which claims the benefit, and is a continuation-in-part, of provisional application Ser. No. 60/561,543 filed Apr. 9, 2004, both hereby incorporated by reference herein as if fully set forth in their entirety.

FIELD OF THE INVENTION

This invention relates generally to bedding products and more particularly to bedding foundations and the method of making the same.

BACKGROUND OF THE INVENTION

Bedding foundations or so-called box spring assemblies comprise a base, usually made of wood, an upper grid including a generally rectangular border wire and a plurality of spring modules sandwiched between and secured to the upper grid and base. Such box spring assemblies or bedding foundations are bulky for purposes of shipping to a bedding manufacturer and costly in terms of storage space. When such a bedding foundation is shipped to a bedding manufacturer, the space and shipping costs are increased and ultimately passed on to the customer.

In order to reduce the space requirements for purposes of shipping, it is customary to compress the bedding foundations to reduce their individual thicknesses and when compressed, to tie them in their compressed state. This involves providing presses and ties which are expensive to acquire and maintain. Additionally, the step of compressing and tying the compressed foundations adds extra time to the shipping process. At the delivery end, the bedding manufacturer must cut the tensioned ties and separate the individual foundation units before applying the requisite padding and covering. Due to the high tension of the ties, this process may be dangerous and requires great care on the part of the bedding manufacturer.

Bedding foundation assemblies are known which may be stacked prior to shipping and shipped as stacks of individual components. Shipping in this manner eliminates the need to compress a plurality of partially assembled bedding foundations for shipping purposes. Applicant's U.S. Pat. Nos. 5,052,064 and 5,361,434, each of which is fully incorporated by reference herein, disclose bedding foundations which may be shipped to a bedding manufacturer in this stacked manner. Multiple spring modules are commonly welded or otherwise secured to an upper grid which may be nestably stacked upon other similar subassemblies for shipping and/or storage purposes. Likewise, the wooden bases may be stacked for shipping and/or storage purposes. Upon arrival at the manufacturing facility, the bedding manufacturer removes the stacked components and assembles them as required to construct a bedding foundation before application of padding and covering. Oftentimes the upper grid and support wires are welded or otherwise secured together to create a spring assembly which may be unstacked and stapled or otherwise secured to a wooden base.

One difficulty bedding manufacturers encounter when constructing a bedding foundation like the one shown in applicant's U.S. Pat. No. 5,052,064 is that an operator must staple each valley of each generally corrugatedly-shaped support wire to the wooden base. This stapling process takes a great deal of time and is therefore, expensive. If performed manually, this process is subject to human error because the operator must properly align each support wire and be sure to staple each valley of each support wire to one of the rails of the wooden base. If automated, this process is subject to error because the stapling machine may fail to detect each valley of each support wire and consequently fail to staple each valley of each support wire to one of the rails of the wooden base.

Another difficulty bedding manufacturers encounter when constructing a bedding foundation like the one shown in applicant's U.S. Pat. No. 5,052,064 is that oftentimes some of the corrugatedly-shaped support wires are bent or otherwise deformed during shipment. Consequently, when the support wires of the spring assembly are stapled to a wooden base, the support wires may be incorrectly positioned relative to the wooden base. The result is a bedding foundation in which one or more of the corrugatedly-shaped support wires are stapled to the base in the wrong locations or missed partially or entirely by the stapler.

Therefore, there is a need for a stapling device which automatically staples the valleys of corrugatedly-shaped support wires to a wooden base in their correct locations. There is further a need for a method of stapling corrugatedly-shaped support wires to a wooden base in the correct positions, even if the support wires are bent.

SUMMARY OF THE INVENTION

The present invention is apparatus for manufacturing a bedding foundation having a base and a wire grid of support wires, comprising at least one vertically moveable staple gun having a staple head and a wire positioner associated with the staple head, the wire positioner being configured to engage one of the support wires and to position the one support wire relative to the staple head such that upon activation, the staple gun staples the one support wire in the intended position to the base, wherein the wire positioner has a fixed positioning element and a movable positioning element, the elements adapted to position the one support wire therebetween.

The support wires can have peaks, valleys, and connecting segments joining the peaks and valleys, and the wire positioner can be configured to engage at least one of the connecting segments of a respective valley. The wire positioner can include a linkage for moving the movable positioning element. The wire positioner can include an actuator which contacts the base and actuates the linkage to move the movable positioning element. The actuator can be spring biased so as to normally position the movable positioning element in spaced relation relative to the fixed positioning element. The wire positioner can include a housing, and the actuator can be mounted for sliding movement relative to the housing. The linkage can have first and second links. The first link can have a first end pivoted to the actuator and can have a second end pivoted to a first end of the second link. The second link can have a second end to which is mounted the movable positioning element, and the second link can be pivoted to the housing between the first and second ends. Thus, when the actuator is biased toward the housing the first link pivots the second link so as to cause the movable positioning element to engage the connecting segment. The actuator can include a pair of legs which straddle the valley of the respective wire.

DETAILED DESCRIPTION OF THE DRAWINGS

Figure 1A:
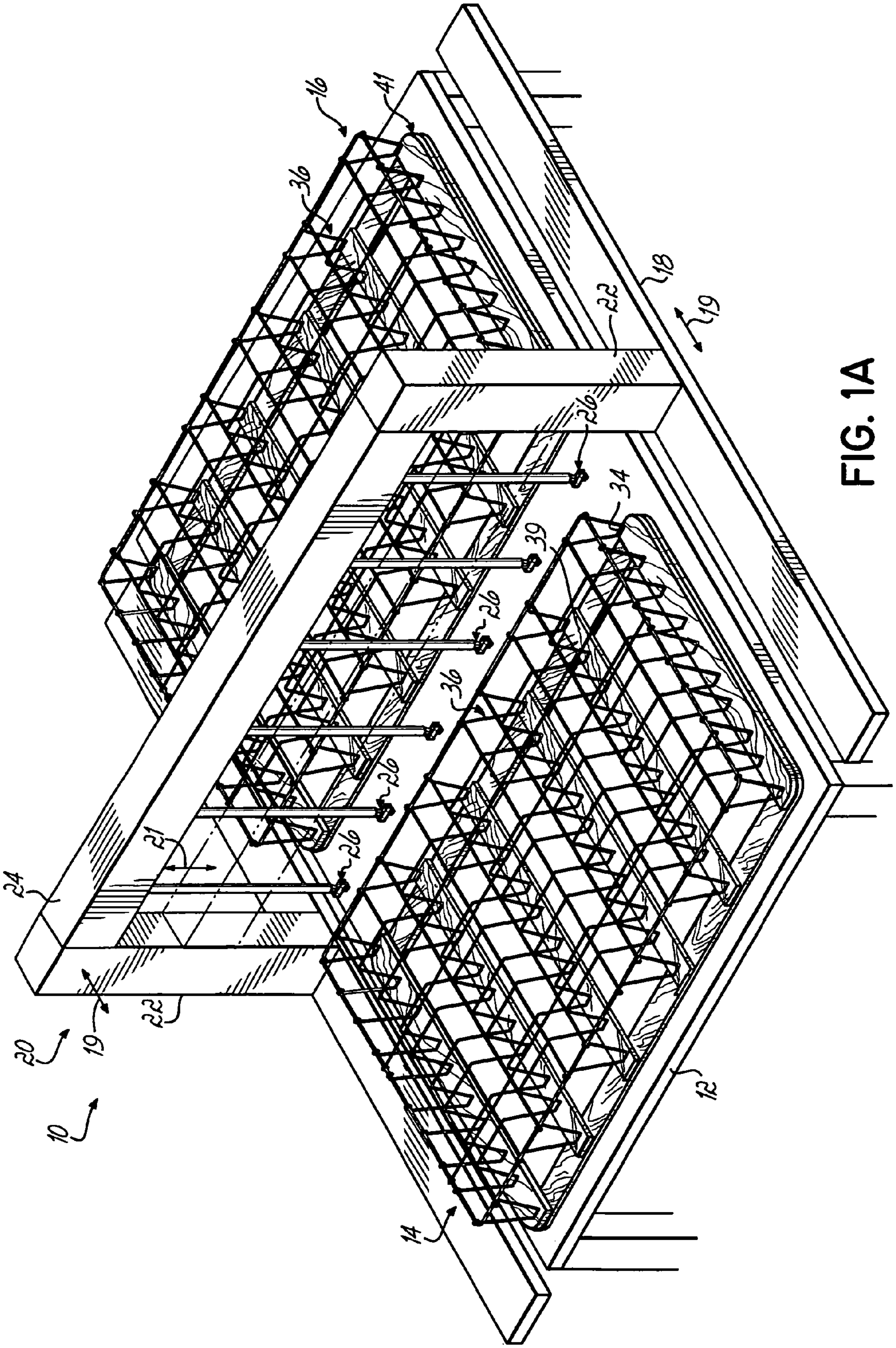
FIG. 1A is a perspective view of one preferred embodiment of the apparatus of the present invention.

Referring to the drawings and particularly FIG. 1A, one preferred embodiment of the apparatus of the present invention is illustrated. FIG. 1A illustrates a stapling apparatus 10 comprising a support table 12 on which are located a first bedding foundation to be stapled 14 and a second bedding foundation to be stapled 16. Although the support table 12 is illustrated as being large enough to support two bedding foundations, the support table may be any size to support any number of bedding foundations.

In this preferred embodiment of apparatus 10, a pair of guides 18 are located on opposite sides of the support table 12. A mounting frame 20 is mounted on the guides 18 and moveable thereon. The mounting frame 20 includes a pair of vertically oriented guide bars 22 which are movable on the guides 18 as indicated by the arrow 19. A horizontally oriented mounting bar or support 24 extends between the guide bars 22 and is movable relative thereto in a vertical direction as indicated by arrow 21. The mounting bar 24 is movable between a raised position and a lowered position via a controller The mounting bar 24 is illustrated in FIG. 1A in its raised position so that the mounting frame 20 assumes a generally U-shape. Any other means may be utilized to move the guide bars 22 of the mounting frame 20 relative to the stationary table 12 and/or to move the mounting bar 24 in a vertical direction.

Figure 2A:
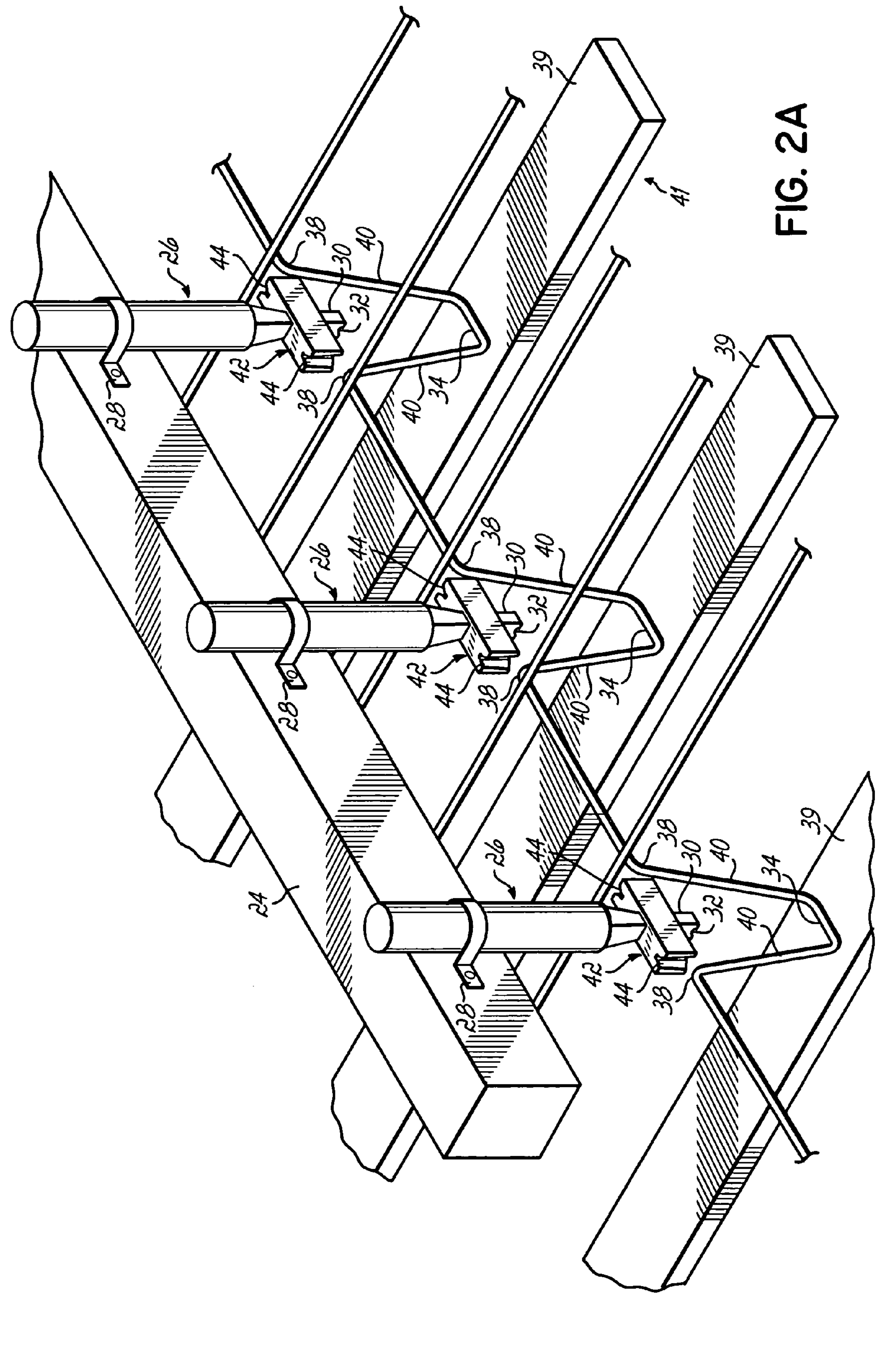
FIG. 2A is an enlarged perspective view of multiple staple guns in a raised position in accordance with one preferred embodiment of the present invention.
Figure 2B:
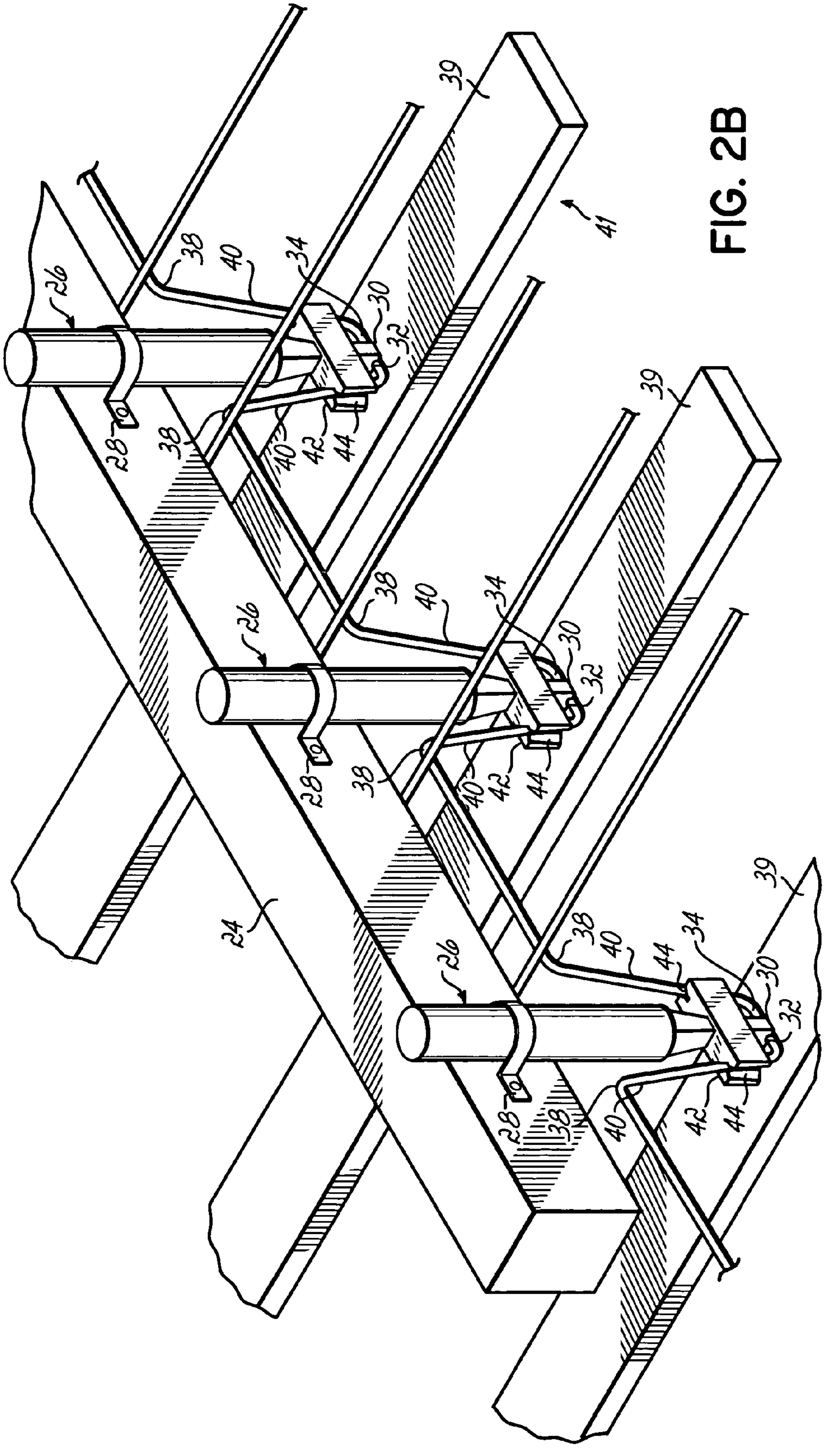
FIG. 2B is an enlarged perspective view of the staple guns of FIG. 2A in a lowered position.

As best shown in FIGS. 2A and 2B, a plurality of staple guns 26 are secured at spaced locations to the mounting bar 24 with clamps 28. Any other means of securing the staple guns 26 to the mounting bar 24 may be utilized if desired. Although three staple guns 26 are illustrated in FIGS. 2A and 2B, any number of staple guns 26 may be mounted on the mounting bar 24 in any desired manner. At the lower end of each staple gun 26 is a staple head 30 having a groove 32 for receiving one of the valleys 34 of one of the support wires 36. As shown in FIGS. 2A and 2B, each support wire 36 (only one being shown) has a plurality of spaced valleys 34, peaks 38 and connecting segments 40 joining the valleys 34 and peaks 38 as disclosed in U.S. Pat. No. 5,052,064. The purpose of the stapling apparatus 10 of the present invention is to secure the support wires 36 to the rails 39 of the base 41 in their intended locations.

As shown in FIGS. 2A and 2B, each staple head 30 has a positioner 42 secured thereto to contact the connecting segments 40 of the support wire 36 and guide the staple head 30 into its intended position as the staple guns 26 are lowered so that the valleys 34 of the support wires 36 end up in the grooves 32 of the staple heads 30. The positioners 42 are preferably made of plastic, but may be made of any suitable material. Each positioner 42 has a pair of opposed grooves 44 sized to receive the connecting segments 40 of the support wire 36 and guide the staple head 30 as it is being lowered by the mounting bar 24. The positioner 42 also guides and moves the support wire 36 to its proper position as the staple heads 30 on the staple guns 26 are lowered so that when stapling occurs the valleys 34 of the support wire 36 are in the correct locations.

Figure 3:
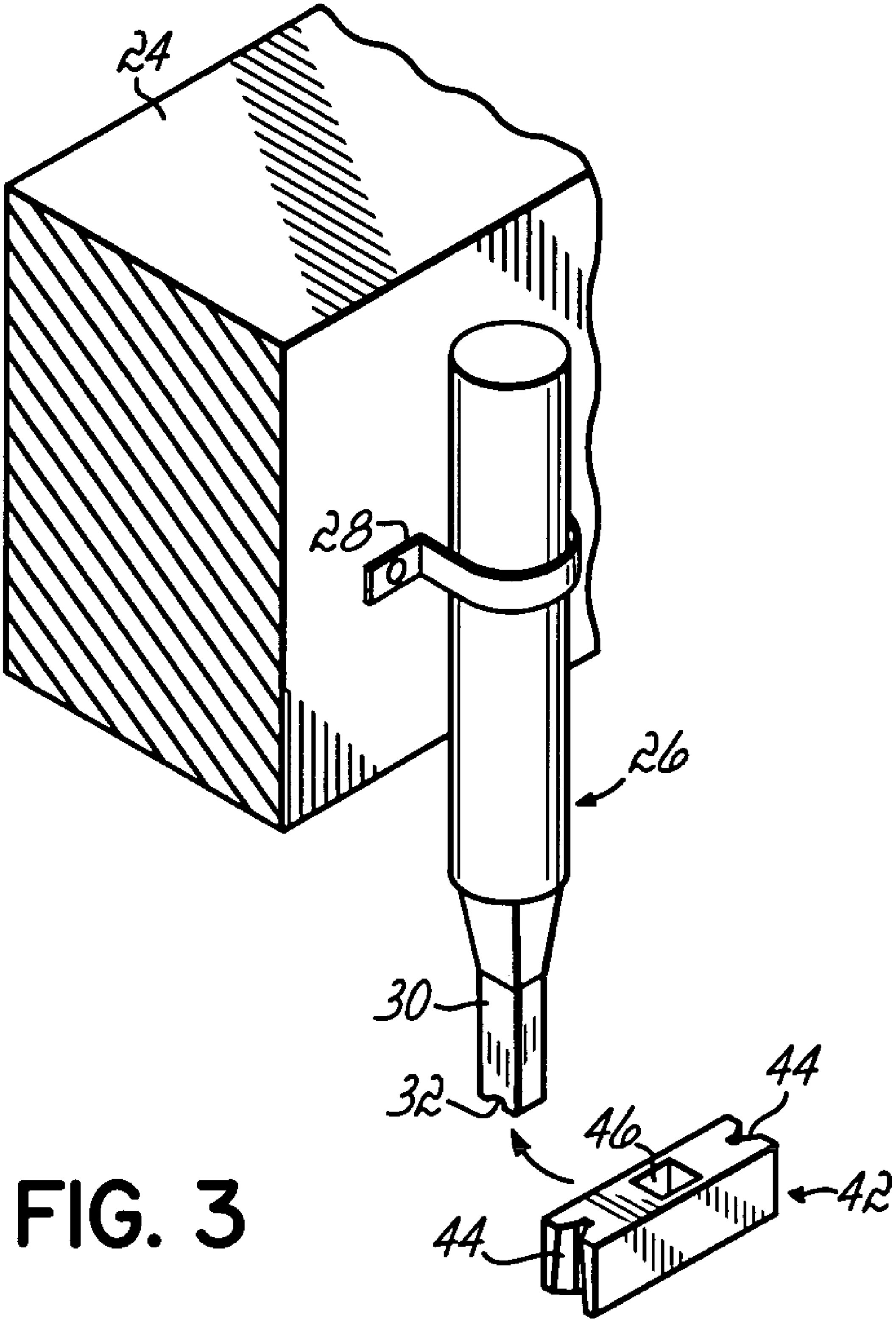
FIG. 3 is an enlarged partially disassembled view of a one of the staple heads of the present invention.
Figure 4:
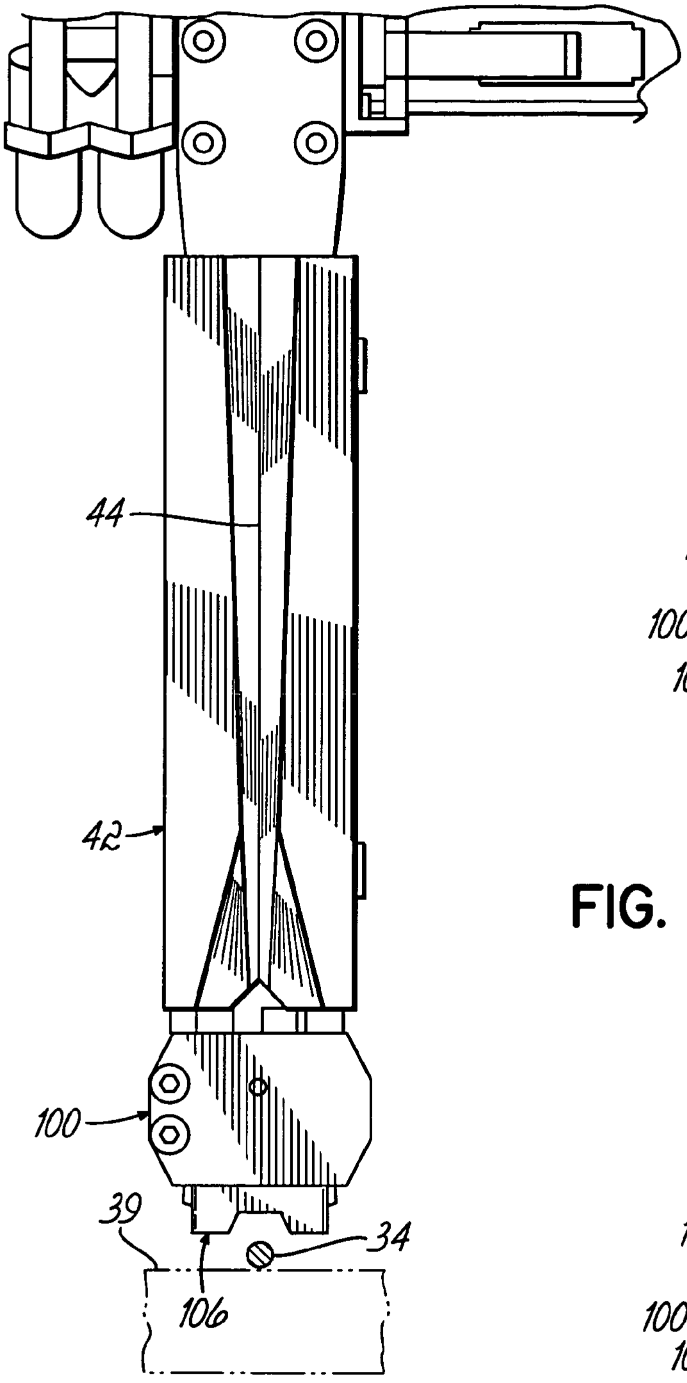
FIG. 4 is a side view of a second wire positioner utilized in conjunction with the first wire positioner of FIGS. 1-3.

As shown in FIG. 3, each positioner 42 has a hole 46 therethrough through which the staple head 30 passes. Thus, the positioner 42 may be removed when damaged or not functioning properly. If desired the positioners 42 may be permanently secured to the staple heads 30 of the staple guns 26.

FIG. 2A illustrates the mounting bar 24 and staple guns 26 secured to the mounting bar 24 in a raised position. FIG. 2B illustrates the mounting bar 24 and staple guns 26 secured to the mounting bar 24 in a lowered position for stapling. When the mounting bar 24 and accompanying staple guns 26 are in a raised position, the bedding foundation may be moved so that another support wire 36 is located underneath the staple guns 26 as in the embodiment shown in FIG. 1B. Alternatively, the bedding foundation may remain stationary and the mounting bar 24 with accompanying staple guns 26 indexed in the direction of arrow 46 to the next support wire 36 as in the embodiment shown in FIG. 1A.

Figure 1B:
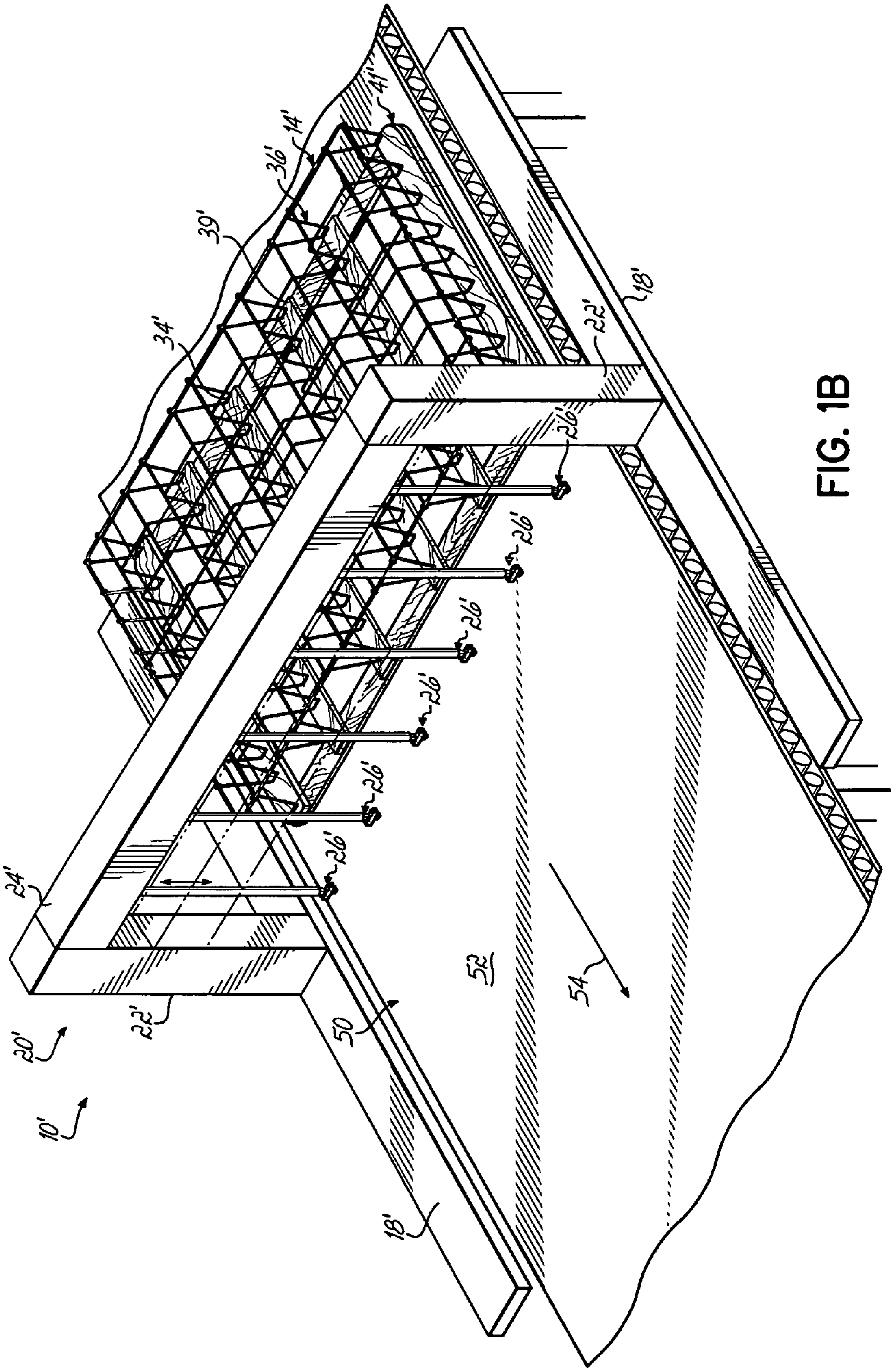
FIG. 1B is a perspective view of another preferred embodiment of the apparatus of the present invention.

FIG. 1B illustrates an alternative preferred embodiment of the apparatus of the present invention. FIG. 1B illustrates a stapling apparatus 10' comprising a conveyor 50 or movable support on which is located a bedding foundation to be stapled 14'. In this embodiment, the bedding foundation 14' comprises a base 41' having transversely extending cross rails 39' to which the valleys 34' of the longitudinally extending support wires 36' are to be stapled. Although one type of conveyor is illustrated comprising an endless belt 52 movable in the direction 54, the conveyor or mover may assume other configurations.

In this preferred embodiment of apparatus 10', a mounting frame 20' is mounted in a stationary position. The mounting frame 20' includes a pair of vertically oriented guide bars 22' which are stationary. A horizontally oriented mounting bar or support 24' extends between the fixed guide bars 22' and is movable relative thereto in a vertical direction. The mounting bar 24' is movable between a raised position and a lowered position via a controller. The mounting bar 24' is illustrated in FIG. 1B in its raised position so that the mounting frame 20' assumes a generally U-shape.

A plurality of staple guns 26' are secured at spaced locations to the mounting bar 24' in any desired manner. Although six staple guns 26' are illustrated in FIG. 1B, any number of staple guns 26' may be mounted on the mounting bar 24' in any desired manner. At the lower end of each staple gun 26' is a staple head 30' and a positioner 42' as described above.

When the mounting bar 24' is raised, the conveyor 50 moves or indexes the bedding foundation 14' a predetermined distance so that the next support bar 36' may be stapled to the rails 39' of the base 41'. When the mounting bar 24' is lowered the staple heads 30' contact the valleys 34' of the support wires 36' and staple them together as described above.

Figure 5:
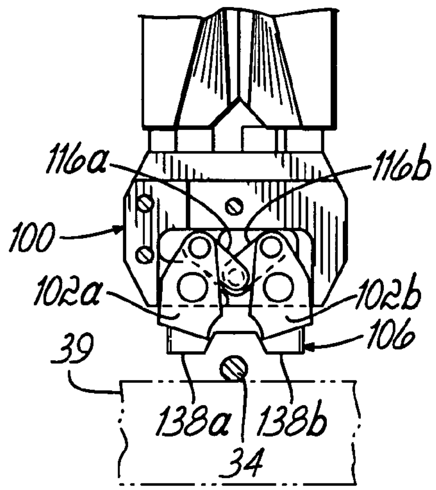
FIG. 5 is a partial side view, similar to FIG. 4, but with one-half of the second wire positioner removed for clarity.
Figure 6:
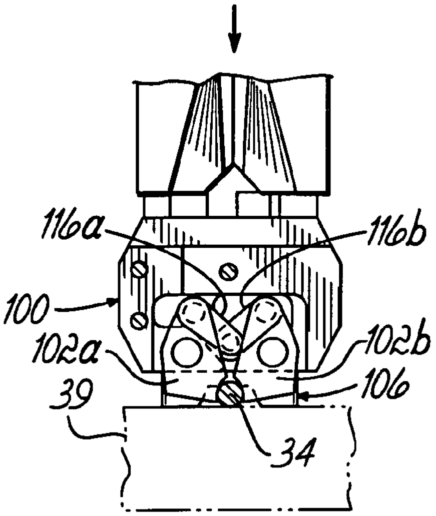
FIG. 6 is a view similar to FIG. 5 but of the wire positioner in a lowered position.

Referring now to FIGS. 4-7, there is illustrated another wire positioner 100 for use either alone or in conjunction with the wire positioner 42 described above. Positioner 100 can have a pair 102 of support wire engagement elements or jaws 102*a*, 102*b* configured to grip or otherwise move into position a valley 34 of a support wire 36 when the staple head 30 of the staple gun 26 approaches the valley 34. The positioner 100 can have a linkage 104 for moving the pair 102 of jaws 102*a*, 102*b* to grip the valley 34. The positioner 100 can have an actuator 106 which contacts the rail 39 of base 41 for actuating the linkage 104 and hence pair 102 of jaws 102*a*, 102*b* (FIG. 6). The actuator 106 can be spring biased via springs 108*a*, 108*b* (FIG. 7, discussed below) so as to normally position the pair 102 of jaws 102*a*, 102*b* in an open position (FIG. 5).

More particularly, the positioner 100 can have a housing 110, with each jaw 102*a*, 102*b* of the pair 102 being pivoted to the housing 110 with pivot pins 112*a*, 112*b* integral to the housing 110, which are accepted in holes 114*a*, 114*b*, respectively, in jaws 102*a*, 102*b*. The linkage 104 can include first and second links 116*a*, 116*b*. Each of the first and second links 116*a*, 116*b* can have a first end 118*a*, 118*b*, respectively, pivoted to a respective one 102*a*, 102*b* of the pair 102 of jaws with pivot pins 120*a*, 120*b* integral to the jaws 102*a*, 102*b*, respectively, which are accepted in holes 122*a*, 122*b*, respectively, in links 116*a*, 116*b*. The first and second links 116*a*, 116*b* can have second ends 124*a*, 124*b* pivoted to one another and to the actuator 106 with pivot pin 126 integral to link 116*a* which is accepted in hole 128 in link 116*b* and in hole 130 in actuator 106. When the actuator 106 is biased toward the housing 110 (FIG. 6), the first and second links 116*a*, 116*b* pivot oppositely and in doing so cause the pair 102 of jaws 102*a*, 102*b* to pivot oppositely toward a closed position around valley 34.

Actuator 106 can be accepted in a slot 132 in a lower side of housing 110. Springs 108*a*, 108*b* can be accepted in holes 134*a*, 134*b* in an upper side of housing 110 and secured with screws 136*a*, 136*b*. Actuator 106 can include a pair 138 of legs 138*a*, 138*b* which straddle the valley 34 of the support wire as the actuator 106 contacts rail 39.

Figure 7:
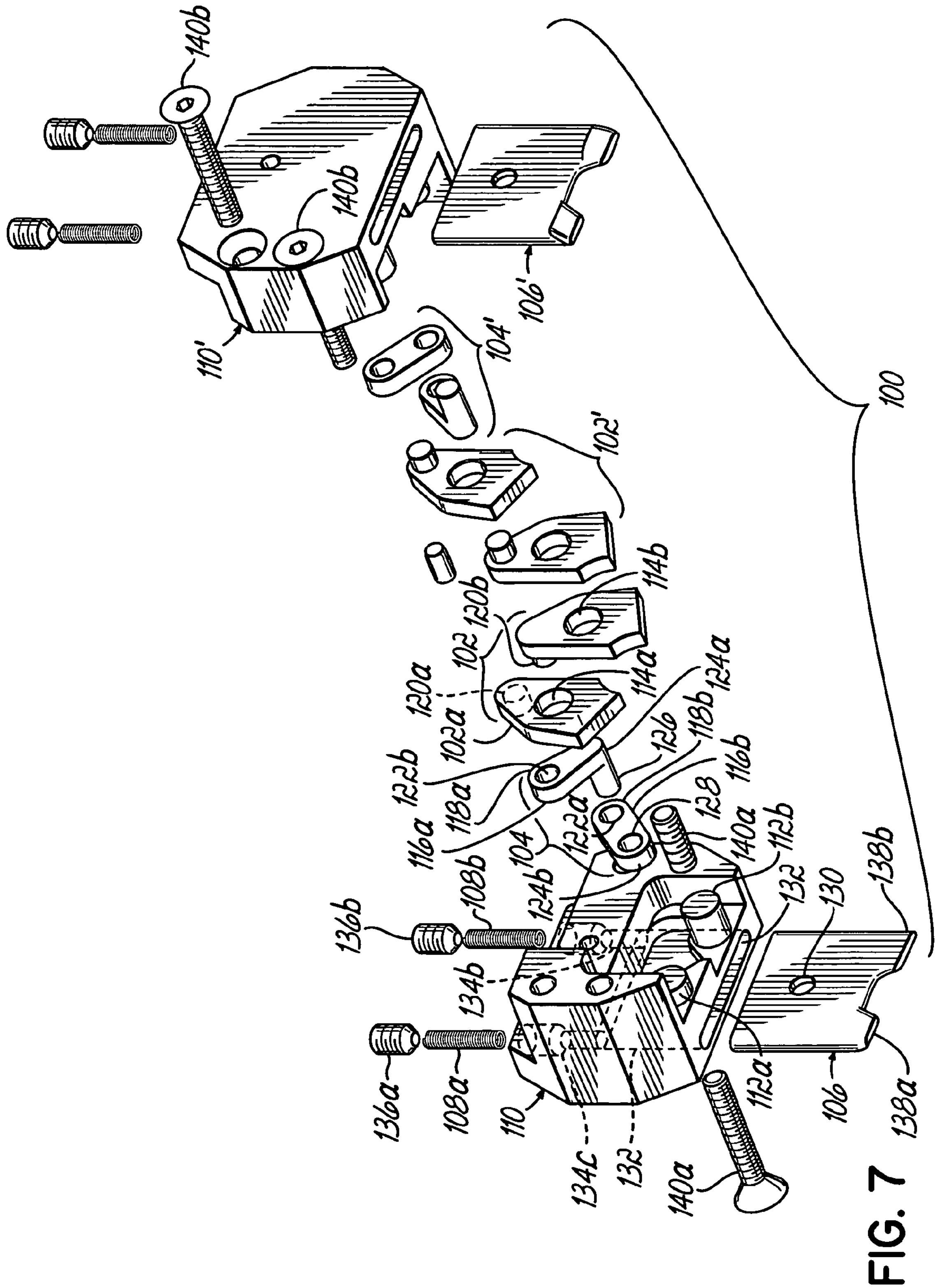
FIG. 7 is an exploded perspective view of the second wire positioner of FIGS. 4-6.

Positioner 100 can include mirror image jaw pairs 102, 102', linkages 104, 104', actuators 106, 106', and housings 110, 110', as shown in FIG. 7. Two screws 140*a* and two screws 140*b* can secure the housings 110, 110' together.

Figure 8:
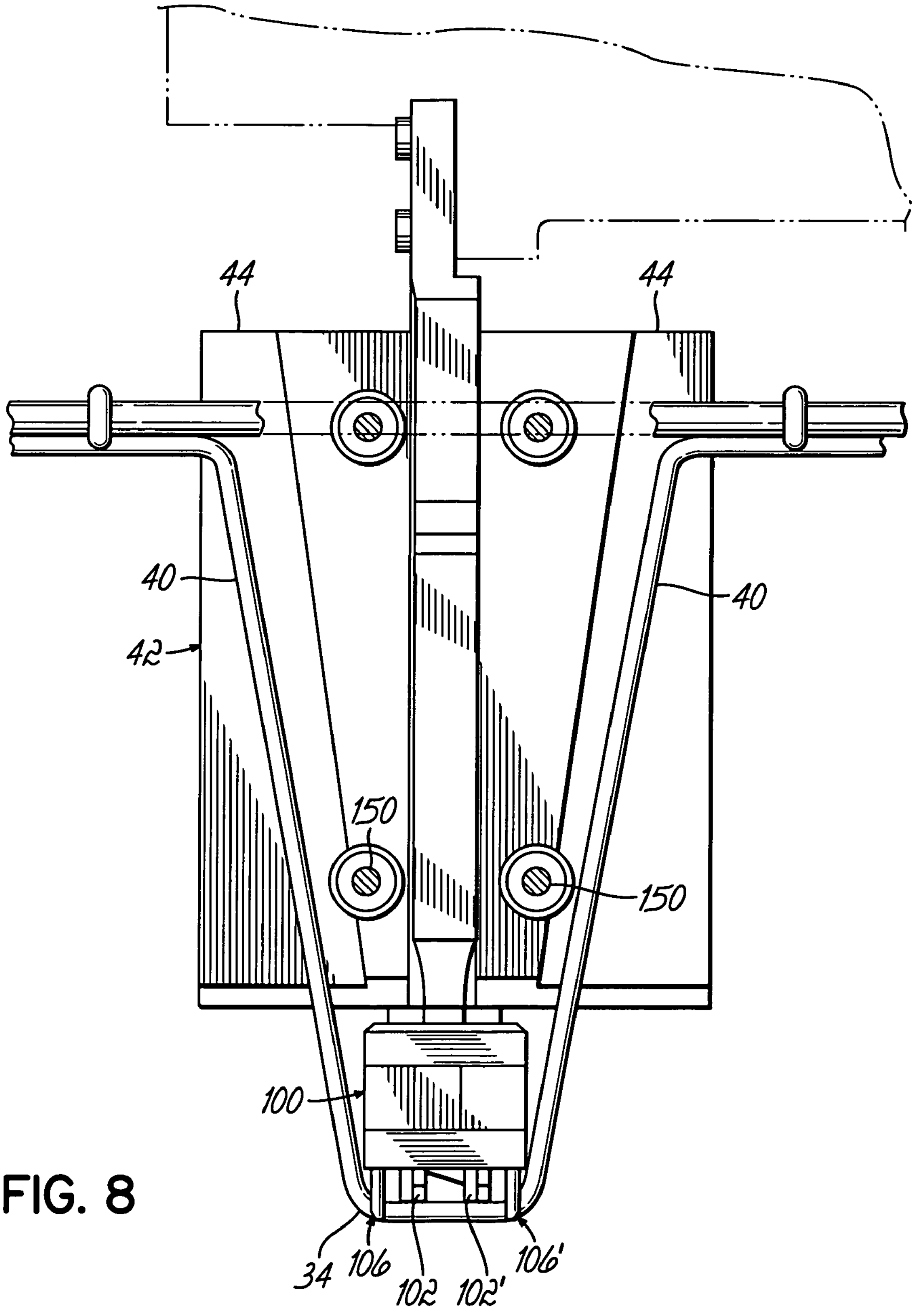
FIG. 8 is a front view of the wire positioners of FIGS. 4-7.
Figure 9:
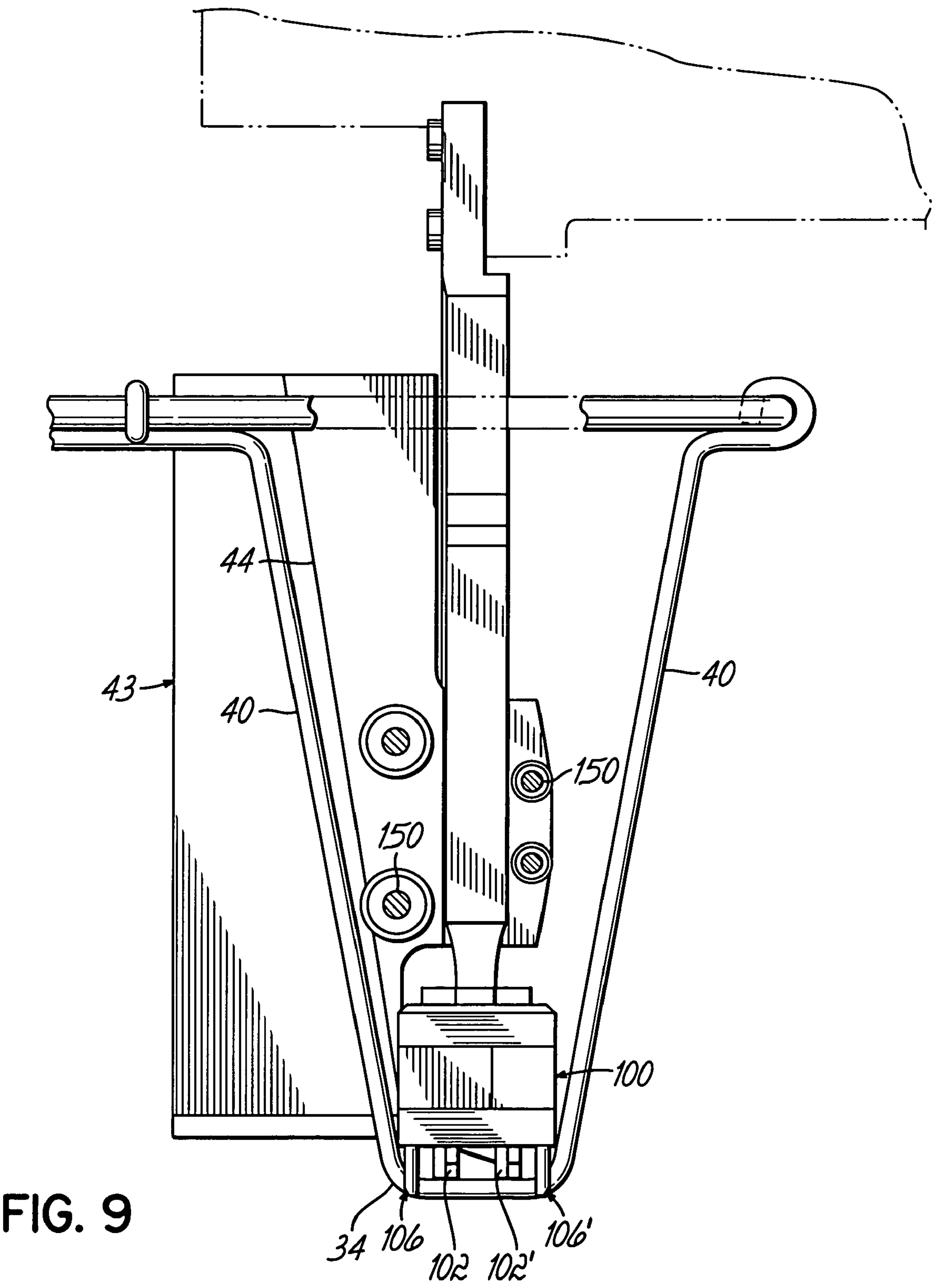
FIG. 9 is a view similar to FIG. 8 but with the first wire positioner being adapted to position the end most support wire without damaging the circumferential border wire.
Figure 10:
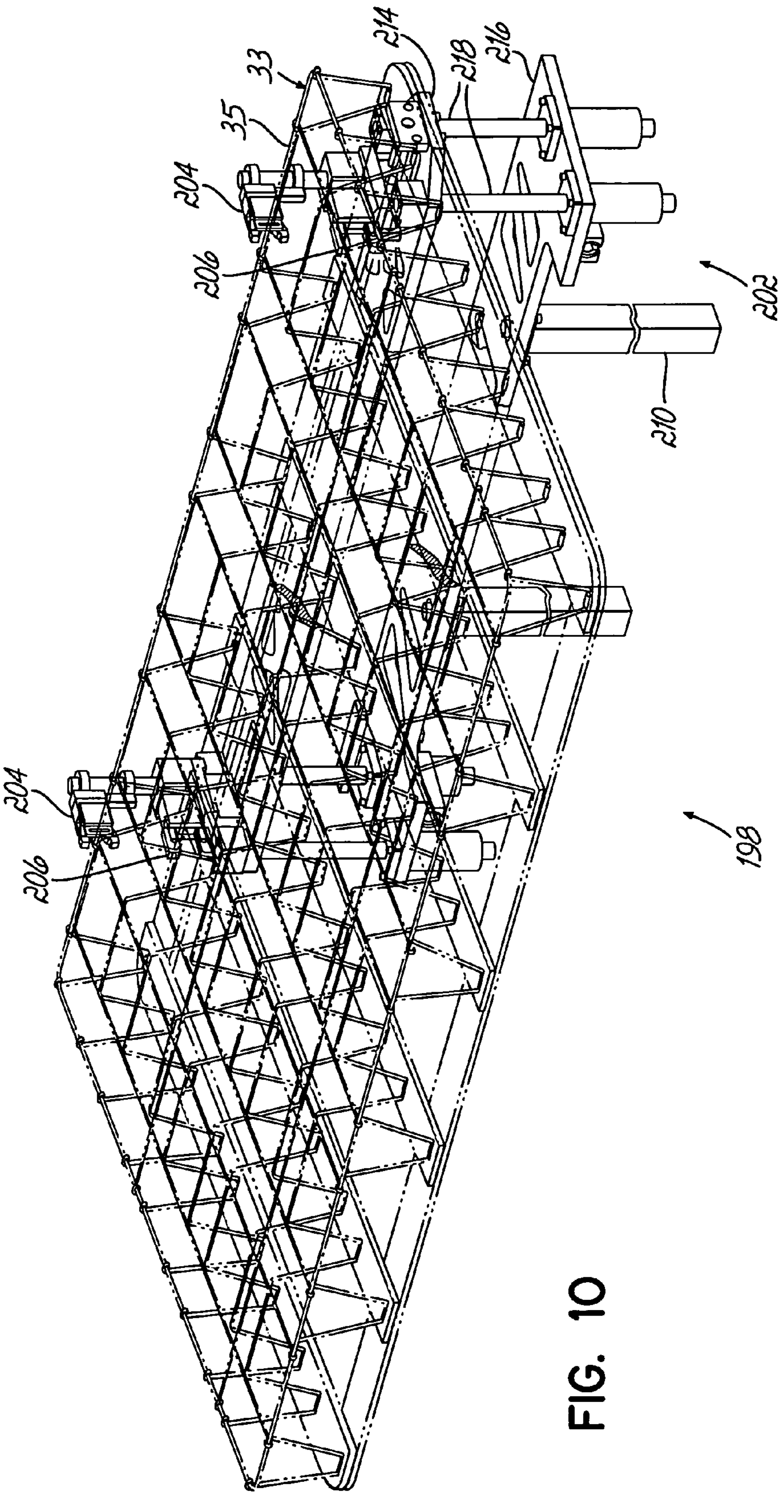
FIG. 10 is a perspective view of a bedding foundation positioning apparatus for use in conjunction with the apparatus of FIGS. 1-8.
Figure 11:
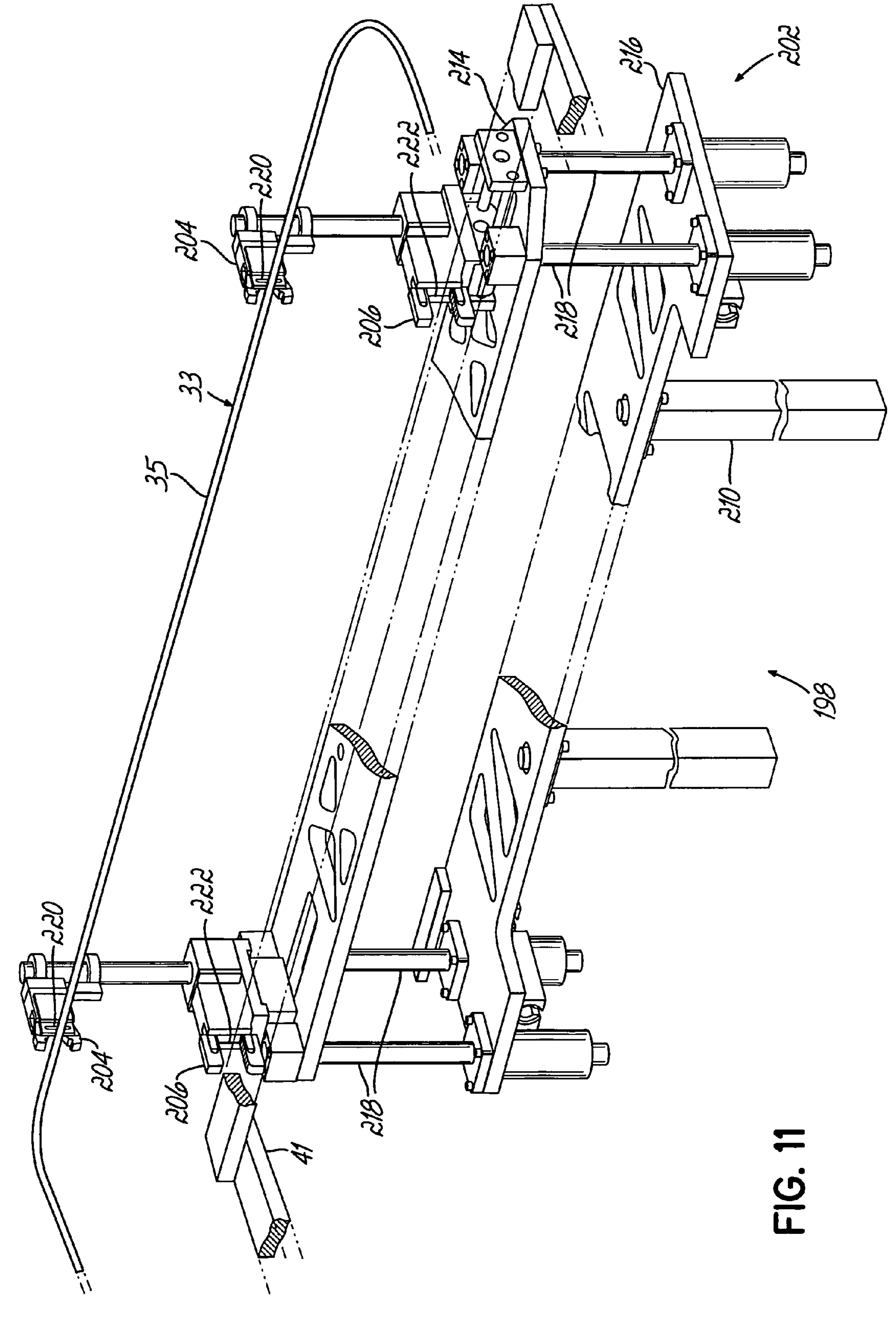
FIG. 11 is an enlarged partial perspective view of the apparatus of FIG. 9.
Figure 12:
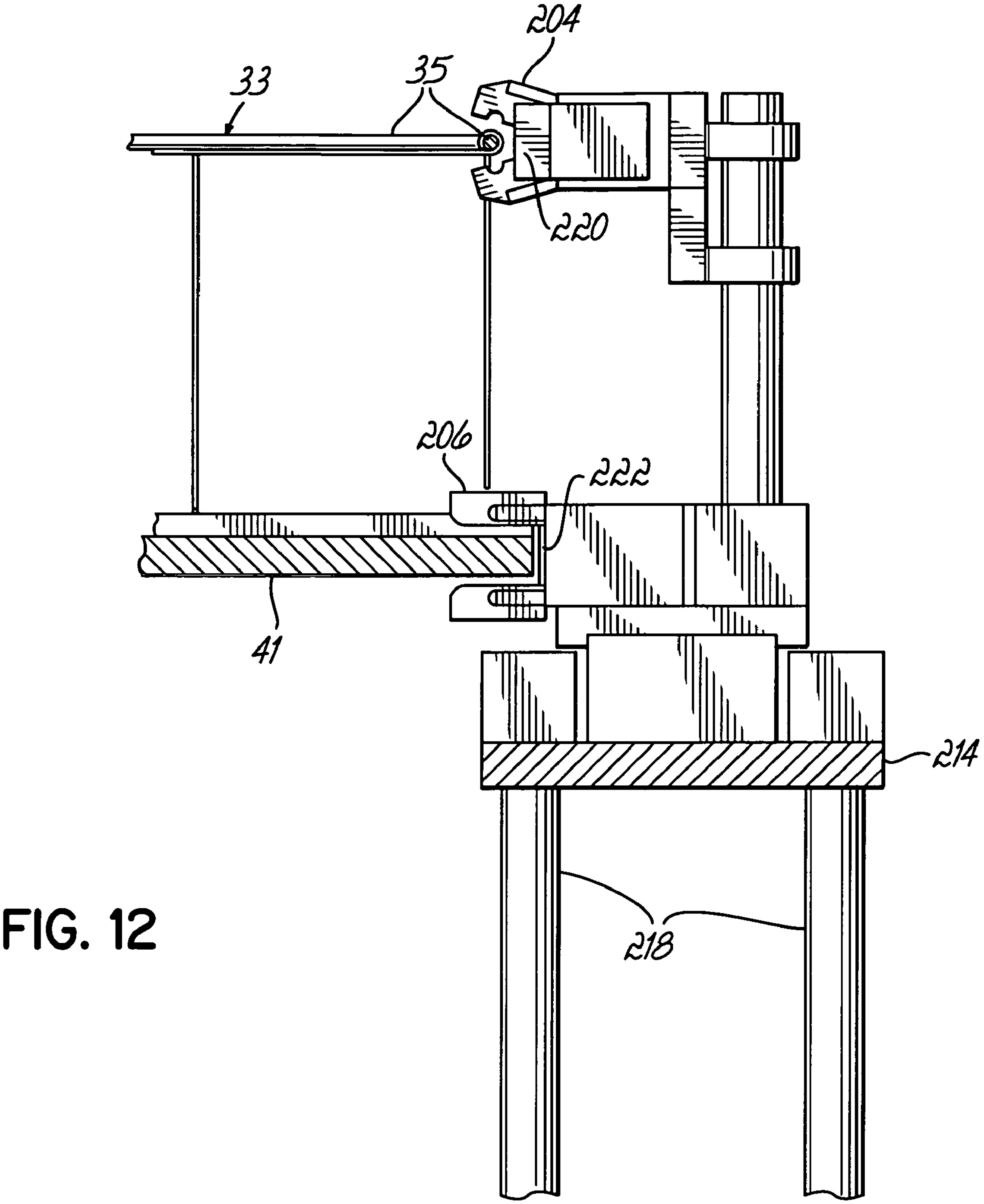
FIG. 12 is a view taken along line 11-11 in FIG. 10.
Figure 13:
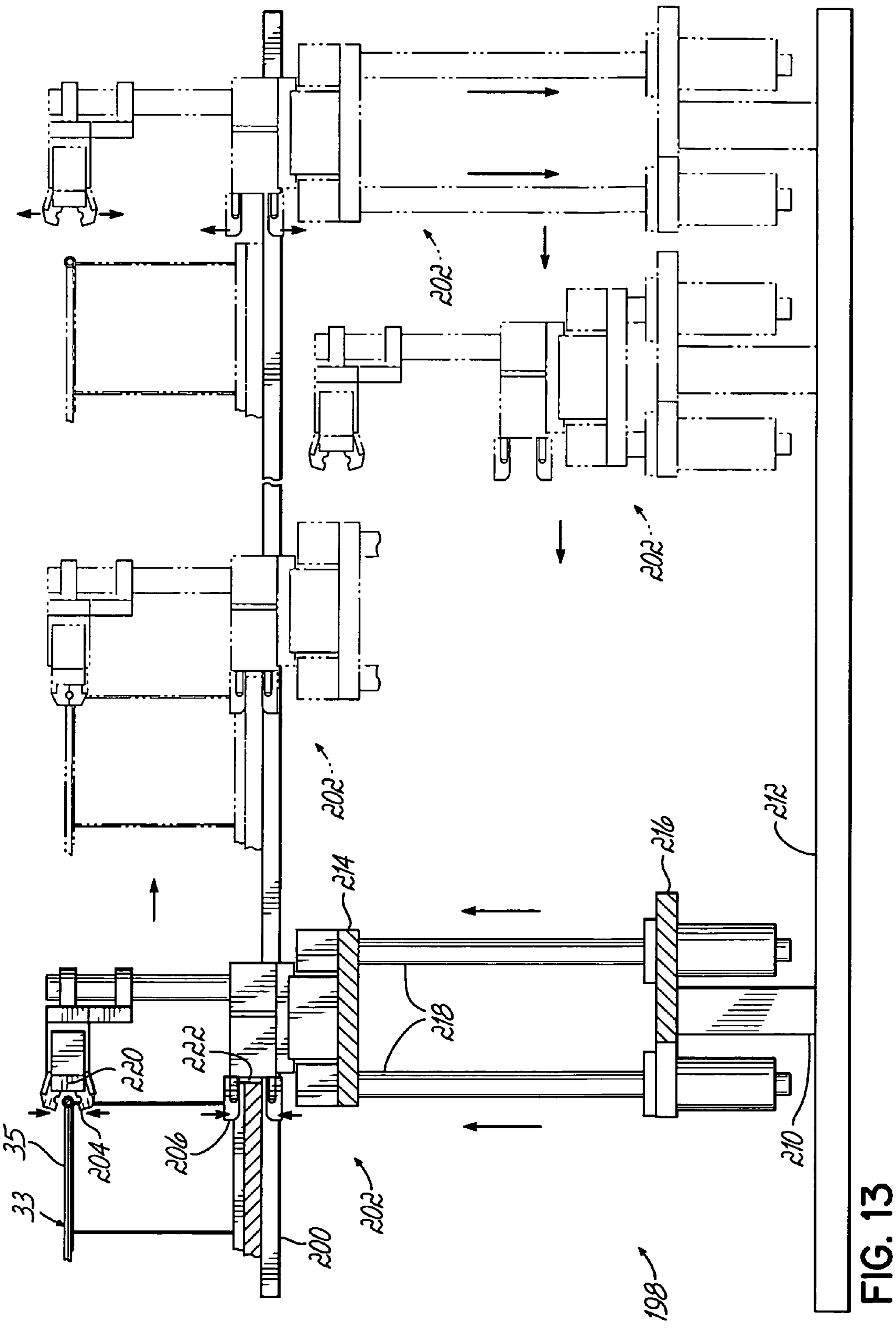
FIG. 13 is a view similar to FIG. 6 illustrating the bedding foundation positioning device positioning the bedding foundation during operation of the staple guns.

Referring now to FIGS. 8 and 9, a first wire positioner 42 (FIG. 8) for positioning interior valleys 34 is contrasted with a first wire positioner 43 (FIG. 9) for positioning edge or end valleys 34. Wire positioner 43 is essentially one half of wire positioner 42 so as to avoid damaging the circumferential border wire of the wire grid. Both positioners 42 and 43 can be fabricated in halves and can be secured together with screws 150 such that staple gun 26 is positioned between the halves.

Referring now to FIGS. 10-13, there is illustrated a bedding foundation positioning apparatus 198 for use in conjunction with either, or both, of the wire positioners discussed above. The apparatus 198 includes a support 200 for supporting the base 41 of a bedding foundation 14 and a moveable, for example horizontally moveable, carriage 202 having a first gripper or pair of grippers 204, 204 for gripping the border wire 35 of the wire grid 33 of the bedding foundation 14, and a second gripper or pair of grippers 206, 206 for gripping the base 41 of the bedding foundation 14. The carriage 202 indexes the wire grid 33 and base 41 beneath the staple gun(s) 26 so that the valleys 34 of the support wires 34 of the wire grid 33 are in position to be stapled to the rails 39 of the base 41. A processor/controller 208 (FIG. 14) controls gripping of the grippers 204, 206, horizontal movement of the carriage 202, vertical movement of the staple gun(s) 26, and stapling of the wire grid 33 to the base 41 by the staple gun(s) 26. A suitable commercially available processor/controller 208 such as a P1123-LEM001 available from Axion Technologies, Houston, Tex., can be used.

More particularly, carriage 202 can have a carriage base 210 that can be mounted for movement by, for example, rollers (not shown) on an apparatus base 212. For example, a servo drive connected to a gear box that is in turn connected to a linear actuator with an internal toothed belt (not shown) can be used to impart forward and rearward motion to the carriage 202 relative to the apparatus base 212. A suitable commercially available drive such as a H130K10000011-01800 available from Hoerbriger-Origa Corporation, Glendale Heights, Ill., can be used. Grippers 204, 206 can be mounted on a gripper support 214 above carriage base 210. An actuator support 216 can be mounted to carriage base 210 below gripper support 214. Actuators, for example pneumatic cylinders 218, can be mounted between the actuator support 216 and gripper support 214 for upward and downward movement of gripper support 214 and hence grippers 204, 206 relative to carriage base 210. The grippers 204, 206, themselves, can be, for example, pneumatically actuated. A servo motor driven ball screw (not shown) can be used to raise and lower mounting bar 24, and the staple guns 26 can be pneumatically actuated.

Figure 14:
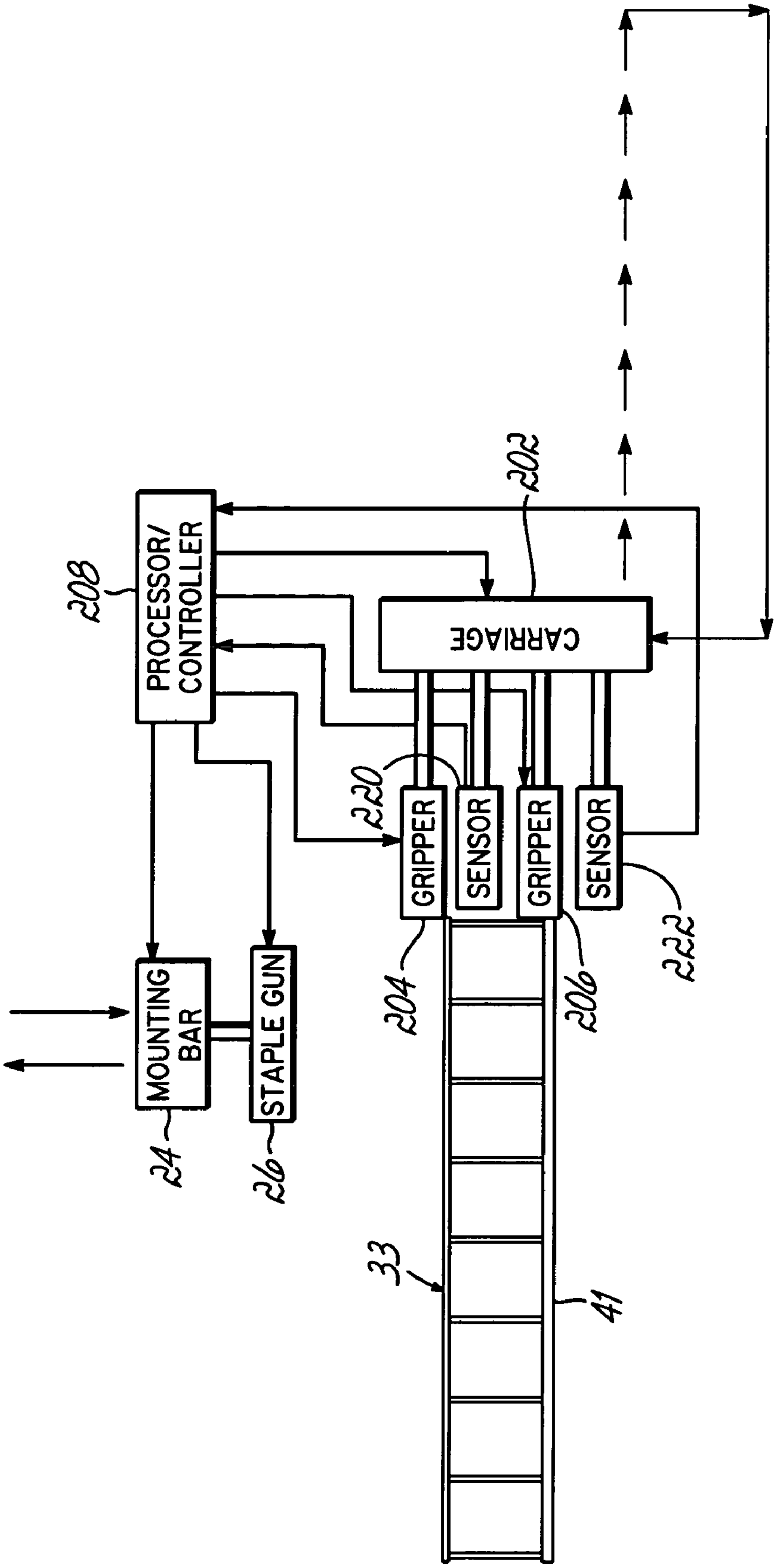
FIG. 14 is a process control block diagram of the apparatus of FIGS. 1-13.
Figure 15:
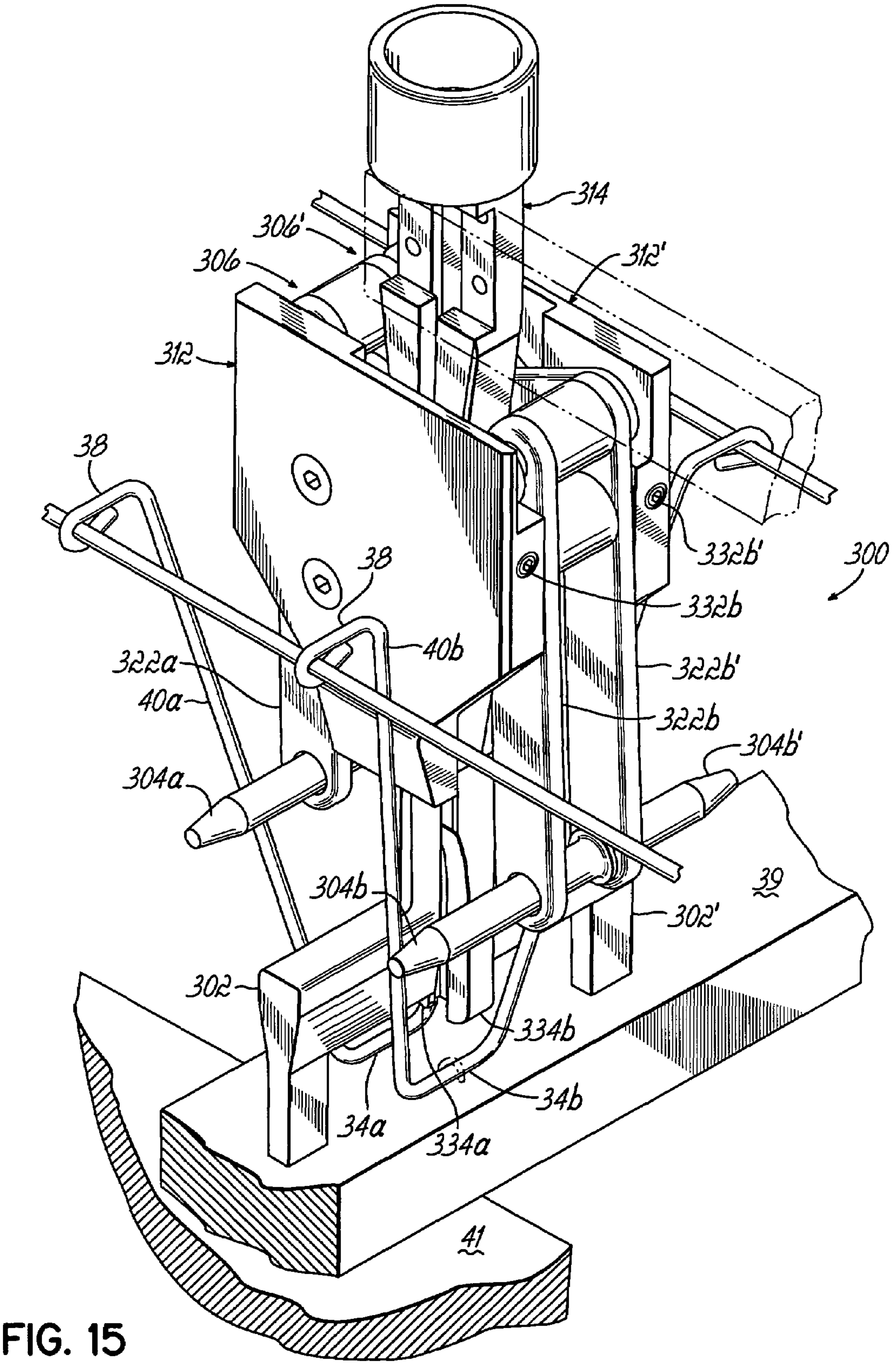
FIG. 15 is a perspective view of a third wire positioner.
Figure 16:
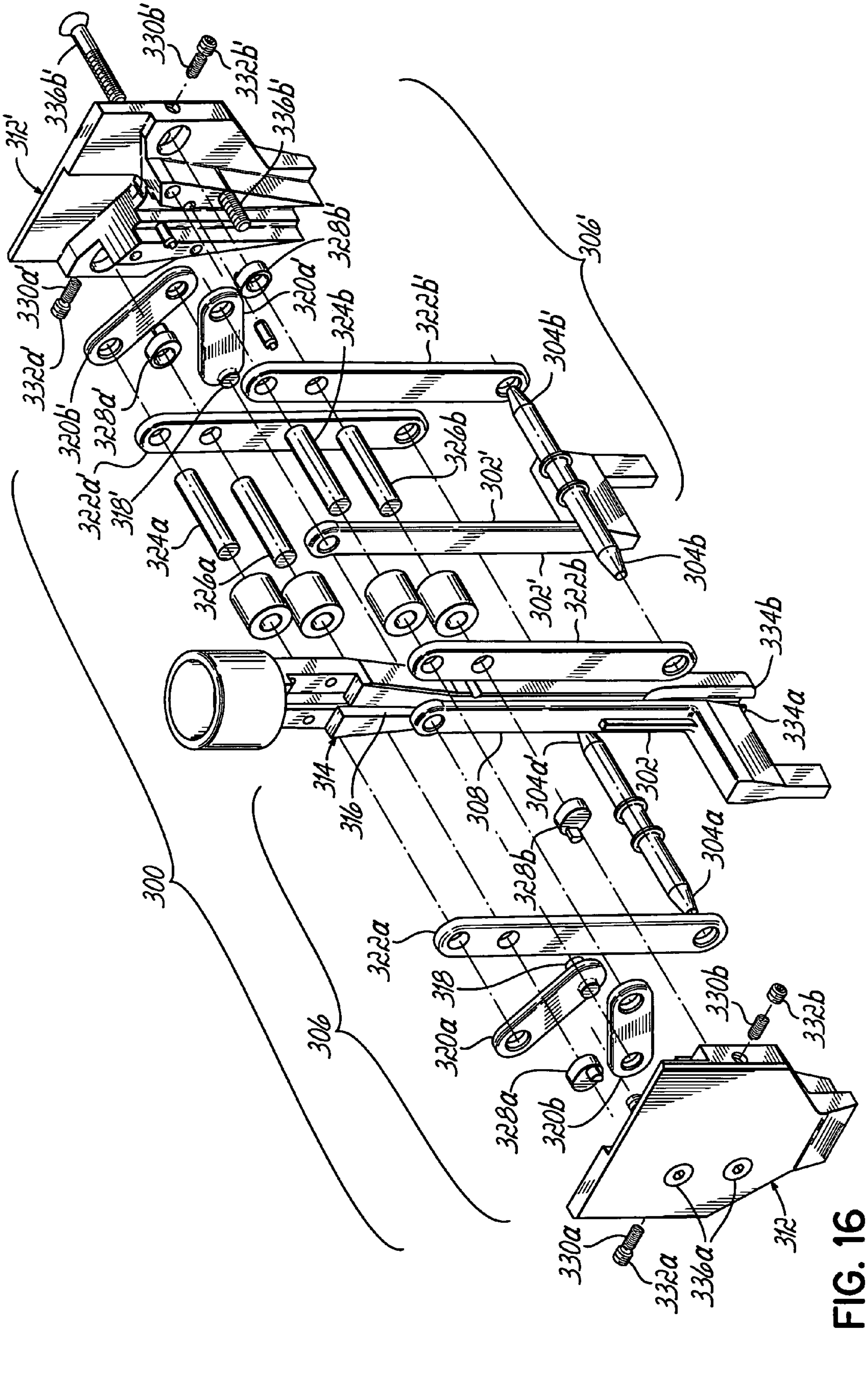
FIG. 16 is an exploded perspective view of the wire positioner of FIG. 15.

Referring still to FIGS. 10-13, and additionally to FIG. 14 in particular, grippers 204 can have a sensor or sensors 220 and grippers 206 can have a sensor or sensors 222. Sensors 220, 222 can be configured to sense when border wire 35 of wire grid 33 is in position to be gripped by grippers 204 and base 41 of bedding foundation 14 is in position to be gripped by grippers 206. Sensors 220 can be, for example, a continuity circuit whereby grid 33 completes a low voltage circuit and sends a signal to the processor/controller to that effect. Sensors 222 can be, for example, plunger type electrical switches which send signals to the processor/controller that they have been depressed. Suitable commercially available sensors 220, 222 such as B13U-M12-AP6X-H1141, N13-EG08K-AP6X-H1341 and SPT1-AP6X available from Turck Inc., Minneapolis, Minn., can be used. Once an operator slides a wire grid 33 and base 41 into position such that the presence of the border wire 35 of the wire grid 33 is sensed by sensors 220 and the base 41 is sensed by the sensors 222, the sensors 220, 222 can send a signal to processor/controller 208 to start a stapling cycle.

Processor/controller 208 can then send a signal to mounting bar 24 to lower 'staple gun(s) 26. Processor/controller 208 can then send a signal to staple gun(s) 26 to staple valley(s) 34 to rail 39 of base 41. Processor/controller 208 can then send a signal to mounting bar 24 to raise staple gun(s) 26. Processor/controller 208 can then send a signal to carriage 202 to index the bedding foundation 14 forwardly so as to place the next row of valleys 34 beneath staple gun 26. The cycle continues until all rows of support wires 36 of the wire grid 33 have been stapled to the base 41. At that time, the processor/controller 208 can send a signal to grippers 204, 206 to release the border wire 35 and base 41, respectively. Processor/controller 208 can then send a signal to carriage 202 (and/or gripper support 214) to lower the grippers 204, 206 below the level of the base 41. Processor/controller 208 can then send a signal to carriage 202 to move carriage 202 rearwardly to the horizontal starting position. Finally, processor/controller 208 can then send a signal to carriage 202 (and/or gripper support 214) to raise the grippers 204, 206 to the vertical starting position. At that time an operator can slide the next bedding foundation 14 toward the grippers 204, 206 such that the border wire 35 is sensed by sensors 220 and the base 41 is sensed by sensors 222. The processor/controller 208 can then repeat the entire cycle for this next bedding foundation. One encoder (not shown) can be employed in conjunction with the horizontally moving carriage 202 drive and another encoder (not shown) can be employed with the vertically moving staple gun mounting bar 24. The processor/controller 208 can be programmed for a specific product having a specific wire grid, wood base, etc., and the encoders can send appropriate signals to the processor/controller 208 so that the appropriate horizontal and vertical movements by the carriage 202 and/or gripper support 214 can be made to staple the specific grid to the specific base. Of course, the processor/controller 208 can be reprogrammed for another product having a different grid and base.

Figure 17:
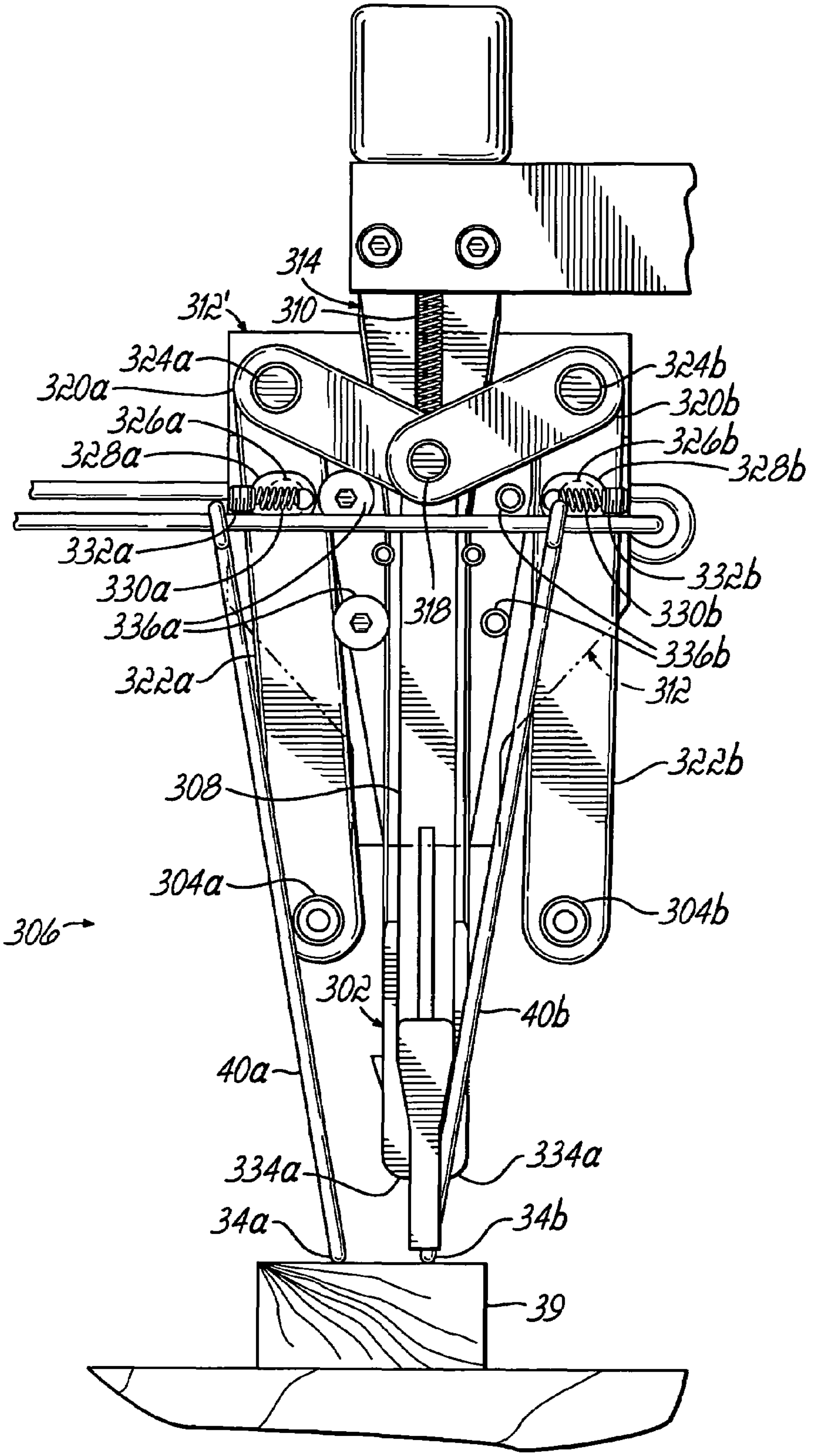
FIGS. 17-20 are sequential side views of the wire positioner of FIGS. 15 and 16 in operation.
Figure 18:
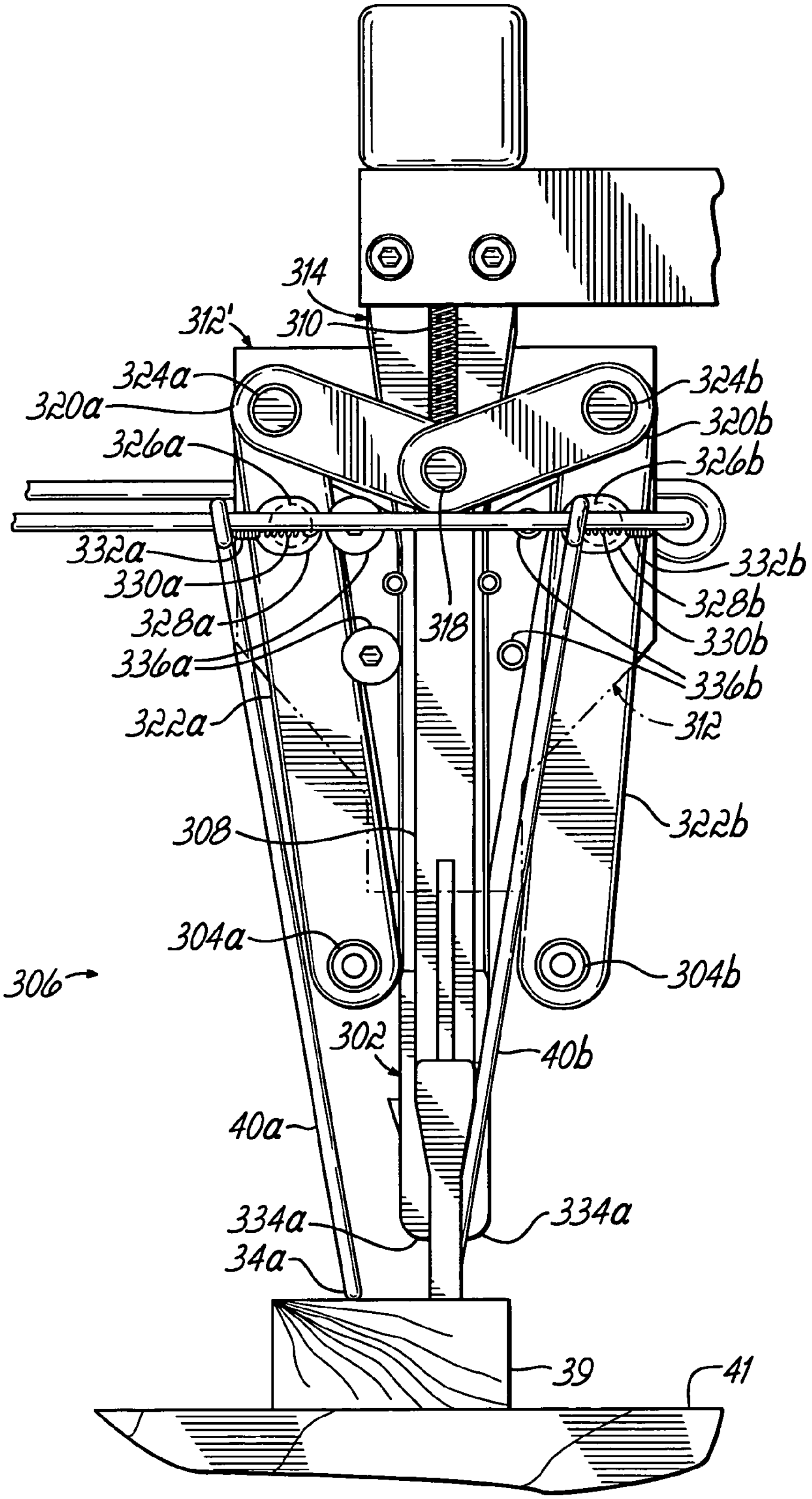
Figure 19:
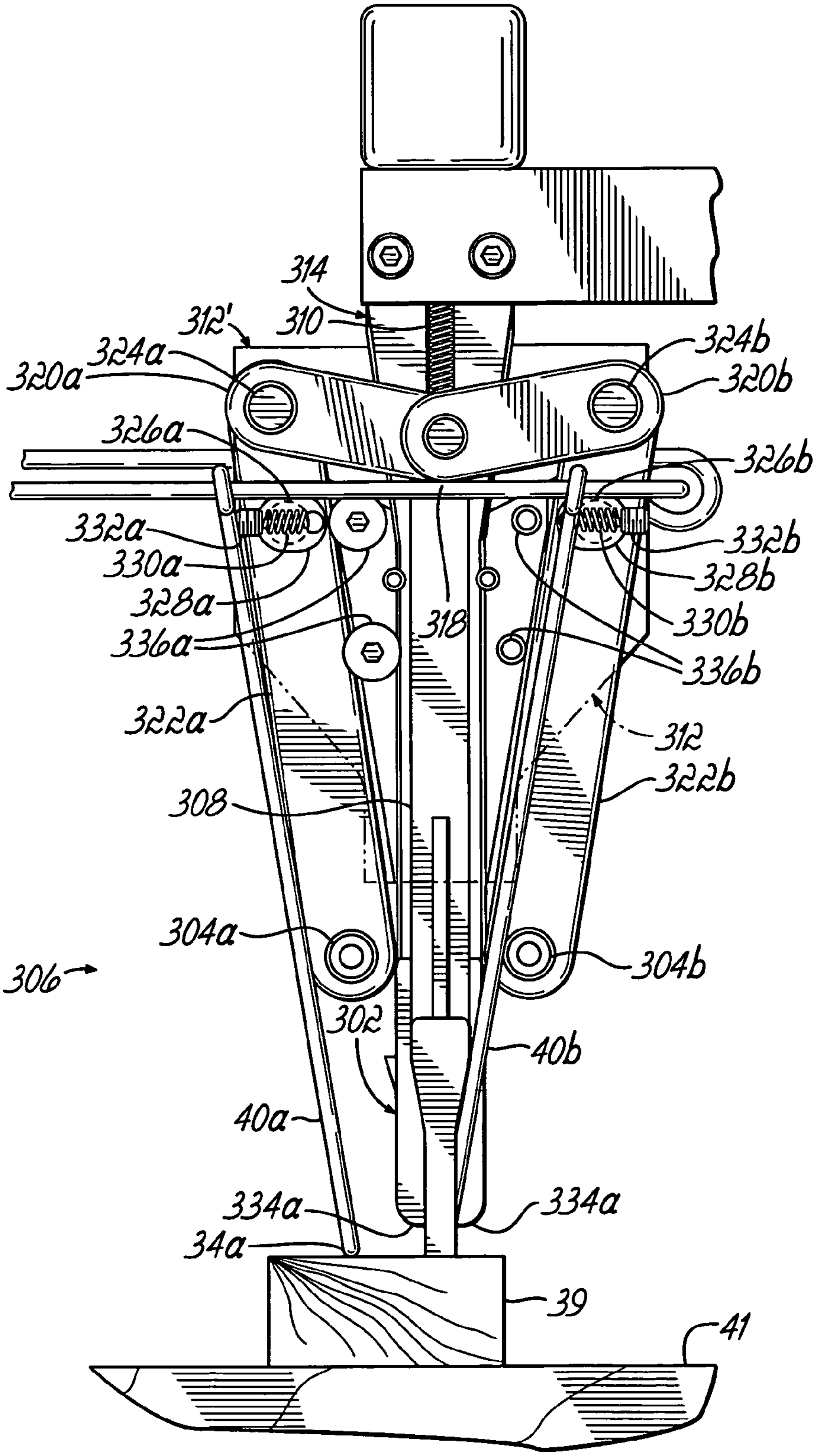
Figure 20:
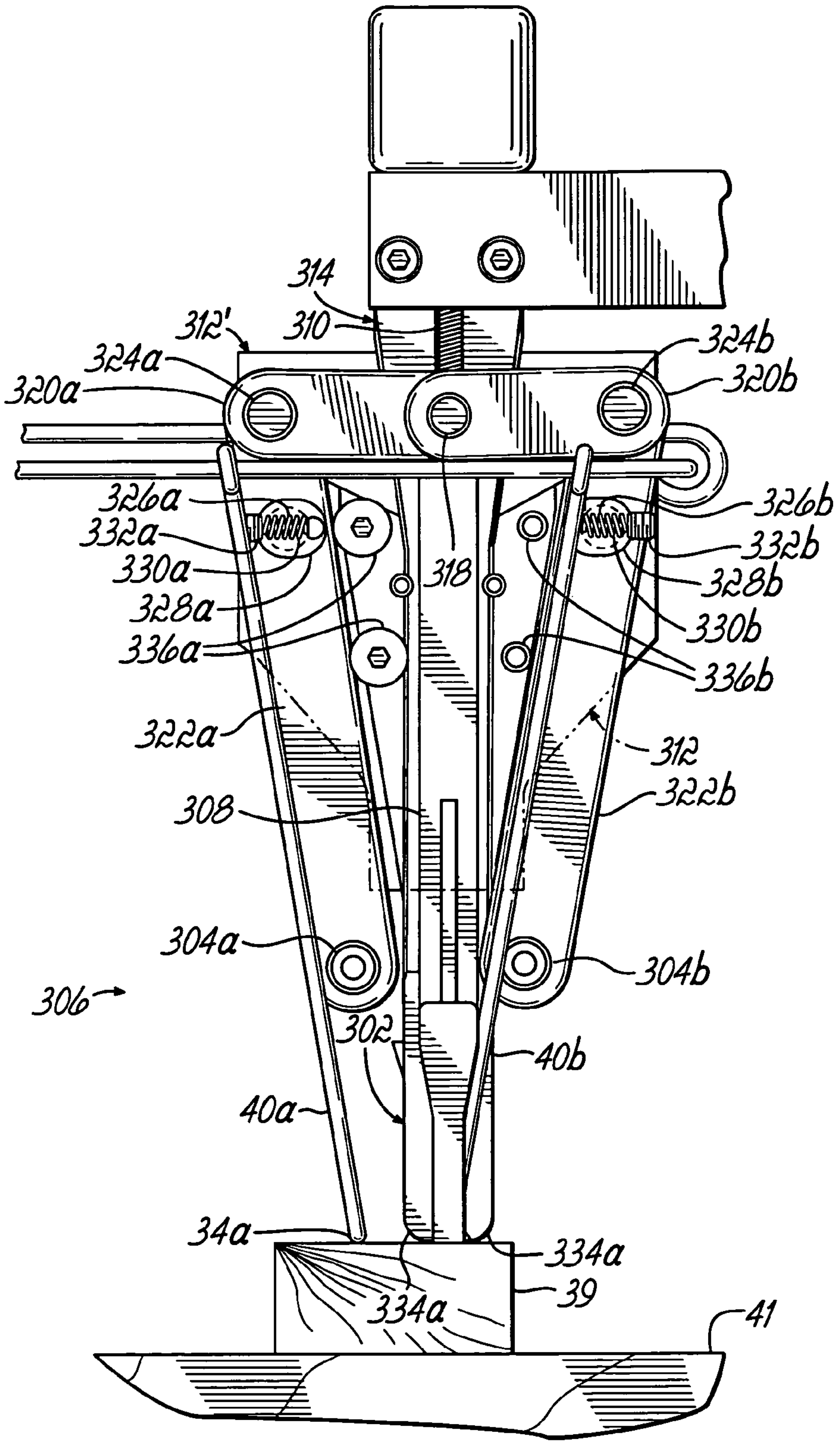

Referring now to FIGS. 15-20, there is illustrated another embodiment of wire positioner 300 according to the present invention. Positioner 300 can have a fixed support wire positioning element 302 and a pair of movable support wire positioning elements 304*a*, 304*b* configured to position a connecting segment 40 and consequently a valley 34 of a support wire 36 when the staple head 30 of the staple gun 26 approaches the valley 34. The positioner 300 can have a linkage 306 for moving the pair of positioning elements 304*a*, 304*b* to move the connecting segments toward the fixed positioning element 302. The fixed positioning element 302 can function as an actuator 308 which contacts the rail 39 of base 41 and actuates the linkage 306 and hence pair of movable positioning elements 304*a*, 304*b*. The actuator 308 can be spring biased via a spring 310 so as to normally position the pair of movable positioning elements 304*a*, 304*b* in an open position (FIG. 17).

More particularly, the positioner 300 can have a housing 312. The actuator 308 can be mounted for sliding movement relative to the housing 312. For example, an actuator support 314 can have a slot 316. A pin 318 can slidably secure the upper end of actuator 308 to slot 316. The linkage 306 can have left hand side first 320*a* and second 322*a* links, and right hand side first 320*b* and second 322*b* links. The first links 320*a*, 320*b* can have a first end pivoted to the actuator 308, by for example pin 318, and second ends pivoted to a first end of the second links 322*a*, 322*b*, respectively by for example pins 324*a*, 324*b*. The movable positioning elements 304*a*, 304*b* can be mounted to the second ends of second links 322*a*, 322*b*. The second links 322*a*, 322*b* can be pivoted to the housing 312 by for example pins 326*a*, 326*b*, which can be mounted for adjustment in for example oval sliding members 328*a*, 328*b* by for example springs 330*a*, 330*b* and set screws 332*a*, 332*b*. The actuator 308 can include a pair of legs 334*a*, 334*b* which straddle the valley 34 of the support wire as the actuator 108 contacts rail 39.

Positioner 300 can include mirror image fixed support wire positioning elements 302 and 302', movable support wire positioning elements 304*a*, 304*b* and 304*a*', 304*b*', linkages 306 and 306', and housings 312 and 312', as shown in FIG. 17. Two screws 336*a* and two screws 336*b* can secure the housings 312, 312' together and to actuator support 314. The positioner 300 is adapted such that the left hand movable positioning element 304*a* positions the left hand connecting segment 40*a* (FIG. 17) between it and the fixed positioning element 302 during downward movement for stapling the valley 34*a*. The positioner is then raised and indexed to the right hand connecting segment 40*b* (FIG. 17), and then the right hand movable positioning element 304*b* positions the right hand connect segment 40*b* between it and the fixed positioning element 302 during downward movement for stapling the valley 34*b*. FIGS. 17-20 illustrate the movement of right hand movable positioning element 304*b* as it positions the right hand connecting segment 40*b* against the fixed positioning element 302 and in position to be stapled, during progressive downward movement of the positioner 300. As is seen from these Figures, the right hand first and second links 320*b* and 322*b* rotate clockwise, driven by upwardly moving actuator 308, to thereby move movable positioning element 304*b* leftward against right hand connecting segment 40*b* and in doing so move the right hand connecting segment 40*b* against fixed positioning element 302.

Although I have described several preferred embodiments of our invention, I do not intend to be limited except by the scope of the following claims.

What is claimed is:

1. An apparatus for manufacturing a bedding foundation having a base and a wire grid of support wires, said apparatus comprising:

at least one vertically moveable staple gun having a staple head and a wire positioner associated with said staple head, said wire positioner being configured to engage one of the support wires and to position the one support wire relative to said staple head such that upon activation, said staple gun staples the one support wire in the intended position to the base, said wire positioner having a fixed positioning element and a movable positioning element, said positioning elements being adapted to position the one support wire therebetween, said support wires having peaks, valleys and connecting segments joining the peaks and valleys, said wire positioner being configured to engage at least one of the connecting segments of a respective valley, said wire positioner including a linkage for moving said movable positioning element, and wherein said wire positioner includes an actuator which contacts the base and actuates said linkage to move said movable positioning element.

2. The apparatus of claim 1 wherein said actuator is spring biased so as to normally position said movable positioning element in spaced relation relative to said fixed positioning element.

3. The apparatus of claim 2 wherein said wire positioner includes a housing, said said actuator mounted for sliding movement relative to said housing.

4. The apparatus of claim 3 wherein said linkage comprises:

first and second links, said first link having a first end pivoted to said actuator and a second end pivoted to a first end of said second link, said second link having a second end to which is mounted said movable positioning element, said second link pivoted to said housing between said first and second ends, whereby when said actuator is biased toward said housing said first link pivots said second link so as to cause said movable positioning element to engage the connecting segment.

5. The apparatus of claim 4 wherein said actuator includes a pair of legs which straddle the valley of the respective wire.

* * * * *